Jan. 19, 1965  D. R. ZUCK  3,166,271
AIRPLANE HAVING NON-STALLING WINGS AND WING-MOUNTED PROPELLERS
Filed Aug. 20, 1962  8 Sheets-Sheet 1

INVENTOR.
Daniel R. Zuck

Jan. 19, 1965  D. R. ZUCK  3,166,271
AIRPLANE HAVING NON-STALLING WINGS AND WING-MOUNTED PROPELLERS
Filed Aug. 20, 1962  8 Sheets-Sheet 2

INVENTOR.
Daniel R. Zuck

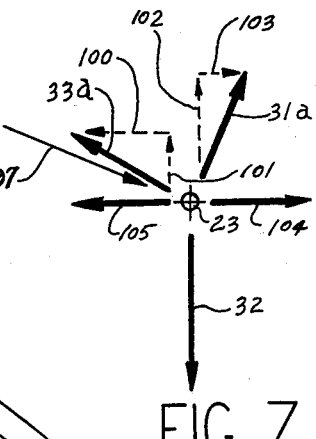
FIG. 7.
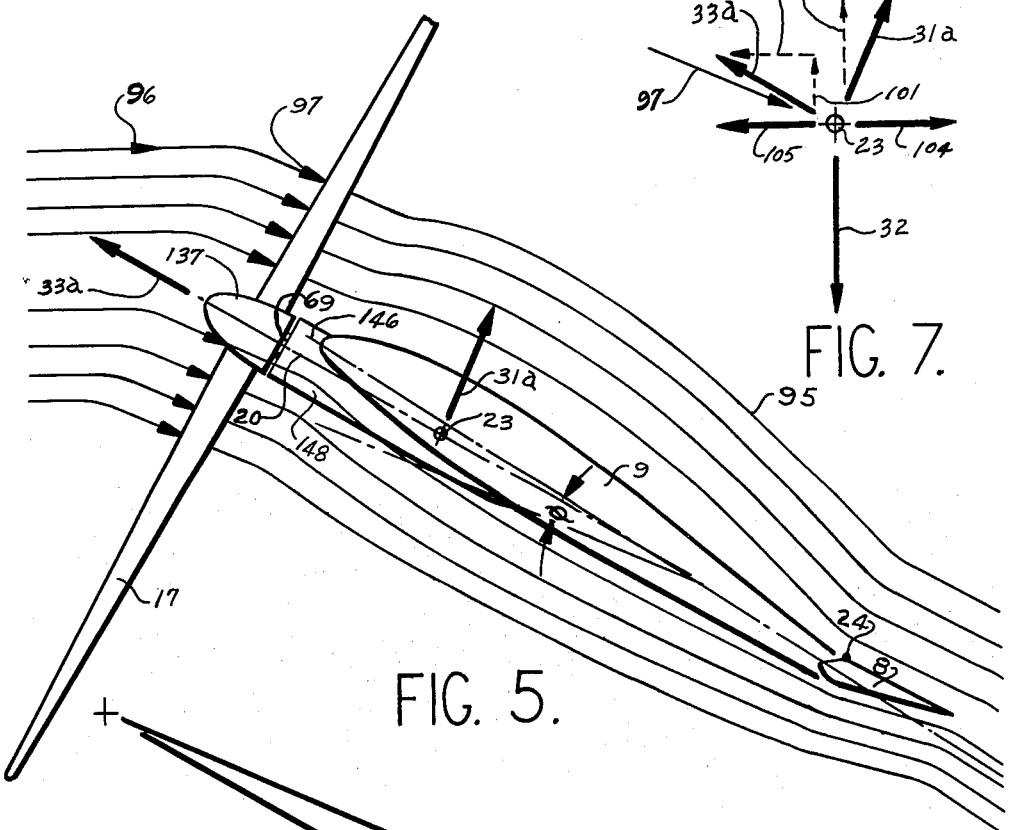
FIG. 5.
FIG. 6.
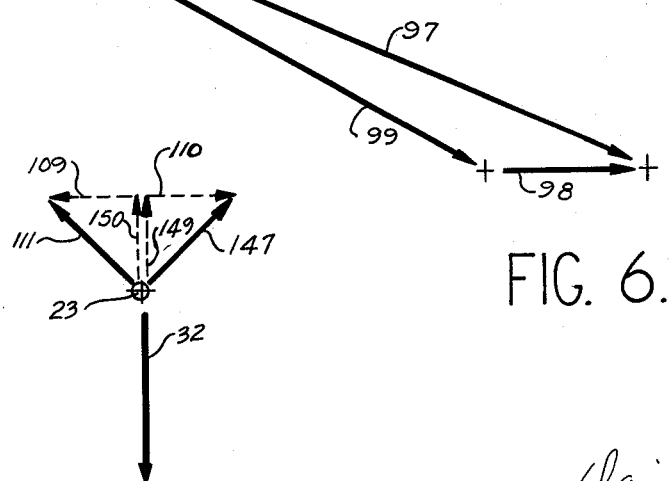
FIG. 16.

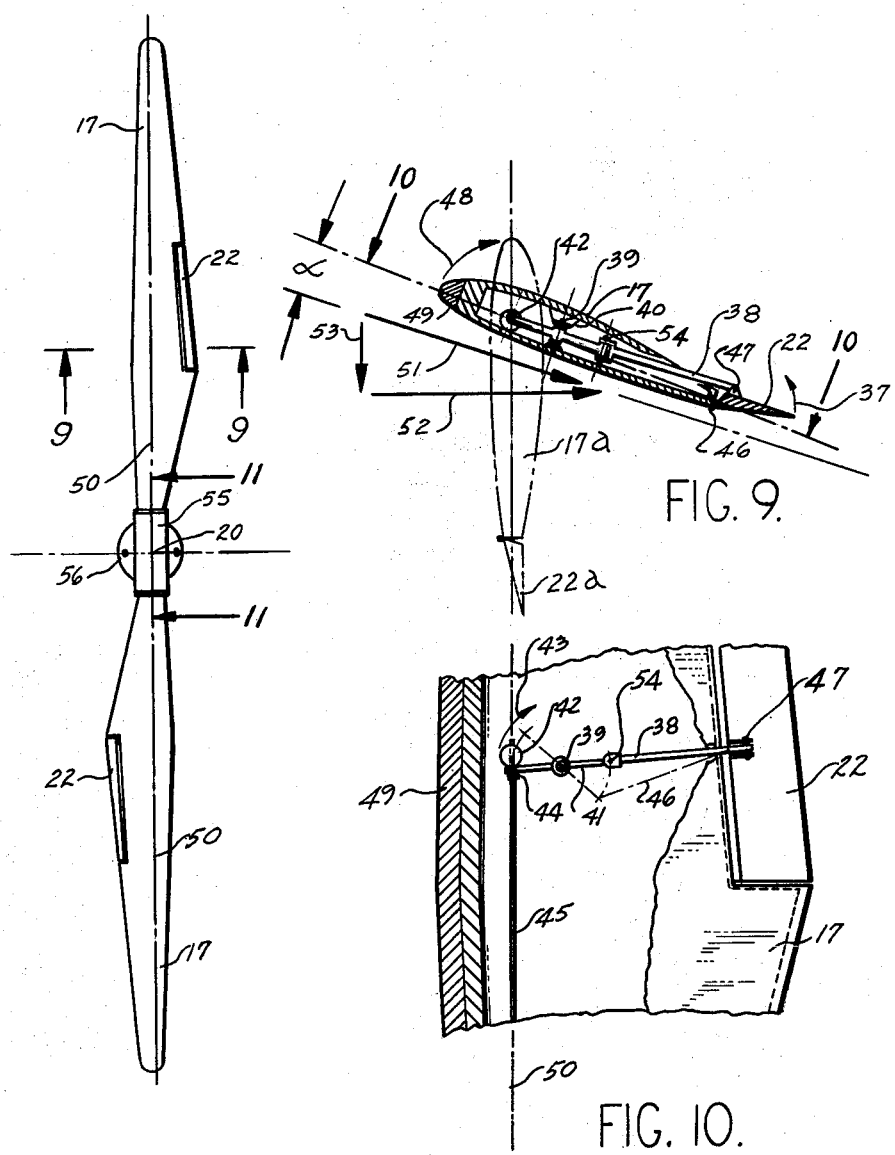

INVENTOR.
Daniel R. Zuck

Jan. 19, 1965 D. R. ZUCK 3,166,271
AIRPLANE HAVING NON-STALLING WINGS AND WING-MOUNTED PROPELLERS
Filed Aug. 20, 1962 8 Sheets-Sheet 7

INVENTOR.
Daniel R. Zuck

United States Patent Office 3,166,271
Patented Jan. 19, 1965

3,166,271
AIRPLANE HAVING NON-STALLING WINGS AND WING-MOUNTED PROPELLERS
Daniel R. Zuck, San Fernando, Calif. (Sylmar, Calif.)
Substituted for abandoned applications Ser. No. 102,072, Apr. 10, 1961, and Ser. No. 405,863, Jan. 25, 1954.
This application Aug. 20, 1962, Ser. No. 218,174
10 Claims. (Cl. 244—7)

My invention relates to airplanes and to certain new and useful improvements making airplanes capable of vertical takeoff and landing at close to zero horizontal velocity which are also capable of horizontal cruising flight at high speed similar to the conventionally winged typed planes.

This invention is an evolutionary development of my prior invention described by U.S. Patent No. 2,347,230 filed December 1938. The conventionally fixed wing airplane is an efficient machine for cruising flight, but it is severely handicapped by the relatively high speeds that are necessary to land the airplane. It is also a dangerous aircraft at low speeds because of its precipitous stalling characteristics. However, my airplane described in the above Patent 2,347,230 filed December 1938 will not stall and this invention is a further development of that aerodynamic principle.

The conventional helicopter in the present state of the art can take off and land vertically very safely at zero forward velocity, but it is very inefficient in horizontal flight. The top speeds and cruising speeds of helicopters in the foreseeable future are inherently limited to less than 200 miles per hour. Also, due to the complexity of its mechanisms, the initial cost, operational costs and maintenance costs of helicopters are prohibitive. Complexity of the helicopter further adds weight to a machine which is already marginal in lifting performance and in economy of operation.

The primary object of this invention is to provide an airplane with exceptionally slow take off and landing means, with means just short of hovering and vertically taking off and landing, and with means to cruise at relatively efficient high speed similar to conventional airplanes.

Another object of this invention is to provide an aircraft with means to take off and land vertically at zero horizontal velocity and, after having climbed to cruising altitude, to provide means to convert to the relatively more efficient horizontal flight means similar to the typically winged airplane.

Another object of this invention is to disclose a vertically takeoff and landing airplane that will be relatively safe from precipitous stalling and uncontrolled descent in the event of power failure during slow takeoff and landing or vertical takeoff and landing.

Another object of my invention is to provide an airplane with the foregoing capability that is relatively simple from a construction point of consideration.

Another object of my invention is to disclose a basic means for slow, safe flight useable and complemented in other airplane configurations.

Many students in using winged airplanes for zero velocity takeoff and landing teach that for vertical takeoff and landing the propellers or rotors should exclusively furnish all the lifting support for the machine; and later for horizontal flight the wings exclusively support the machine.

Heretofore, the advantage of using the wing lift in conjunction with the propeller lift for slow flight, hovering and vertical takeoff and landing was not taught. Heretofore, it was not taught that, by inclining the wing with propeller to approximately 45 degrees, the wing and propeller jointly share in lifting the machine in vertical takeoff and landing.

In my invention, due to the combination of the lifting of the propellers and the lifting of the wings for vertical takeoff and landing, it is not necessary to incline the propellers and wing beyond an angle of approximately 45 degrees above the horizontal, making transition from vertical flight to horizontal flight fully controllable, and less hazardous in the event of power failure when the aircraft is near the ground.

Heretofore students of this art rotated the wings and propellers 90 degrees, directly vertical for take-off and landing, and then rotated them 90 degrees to horizontal position for cruising flight. In my scheme the wings share in the lift of the machine along with the propellers, and consequently place less critical demand on the propeller thrust for the safety of the plane in power loss or power failure.

Therefore, another object of my invention is to provide a means to take-off and land vertically by inclining the wings and propeller thrust axes approximately 45 degrees from the horizontal.

Many students of the art consider it mandatory to incline the wings and propellers by positive mechanical means through power driven actuators. For safety reasons I have chosen to freely mount the wings supporting the propellers on a horizontal pivot as I have disclosed in my Patent Number 2,347,230, filed December 1938 in the FIGURES 4, 5, 6 and 7, of which this patent application is an improvement and to allow the pilot to control the wing's, including the propeller's, vertical inclination through an aerodynamic control surface on the trailing edge of the wing, thereby to permit the wing to freely, instantly and to automatically sense and to adjust its angle of attack to the constantly varying angle of wind direction as will occur precipitously when the power to the propeller has failed when hovering or in vertical take-off and landing.

Thus an aerodynamic servo actuated wing with the non-stalling characteristics, as I have disclosed in the said Patent Number 2,347,230, filed December 1938, provides the plane's pilot with an unusually safe vertical take-off and landing capability.

Therefore another important object of my invention is to provide a wing and propeller combination that adjusts to and senses the airflow direction and which automatically adjusts its angular attitude to the wind direction independent of the pilot's control in the event of a power failure during vertical take-off, vertical landing, or transition to horizontal flight.

Another object, as will be obvious in examination of the drawings and specification, is to disclose a means of vertical take-off and landing by means of the vectorial summation of the propeller thrust forces and the equal wing lift forces in opposition to the gravity vector.

This application is a substitute for my prior patent application for an Airplane Having Non-Stalling Wings and Wing Mounted Propellers, Serial No. 102,072, filed April 10, 1961, now abandoned on which six claims were allowed, and a substitute for patent application Serial No. 405,863, filed January 25, 1954, for a convertaplane also abandoned.

How the foregoing objects and advantages were secured, together with others which will occur to those skilled in the art, will be more apparent from the following description making reference to the accompanying drawings, in which—

FIGURE 1 is a plan view of the aircraft;
FIGURE 2 is a front view of the same aircraft;
FIGURE 3 is an enlarged cross-sectional view of the same aircraft taken on the offset line 3—3 in FIGURE 1 showing the horizontal flight attitude;
FIGURE 4 is an enlarged cross-sectional view of the same aircraft taken on the same offset line 3—3 in FIG- URE 1 showing the attitude of the wing for slow take-off and landing, and for vertical take-off and landing;

FIGURE 5 is an enlarged schematic view of the mass-airflow over the wing and propeller as in FIGURE 4 with the aircraft's horizontal movement in relatively slow velocity;

FIGURE 6 is an illustration of the vectorial resolution of the resultant wind directions;

FIGURE 7 is a vectorial resolution of the thrust, lift, drag and gravity forces of the wing and propeller combining to lift the weight of the airplane;

FIGURE 8 is an enlarged detail of a typical propeller;

FIGURE 9 is an enlarged cross-sectional view taken on line 9—9 in FIGURE 8;

FIGURE 10 is an enlarged cross-sectional view taken on the line 10—10 in FIGURE 9;

FIGURE 16 is a vectorial resolution of the forces represented in FIGURE 15;

Figure 1:
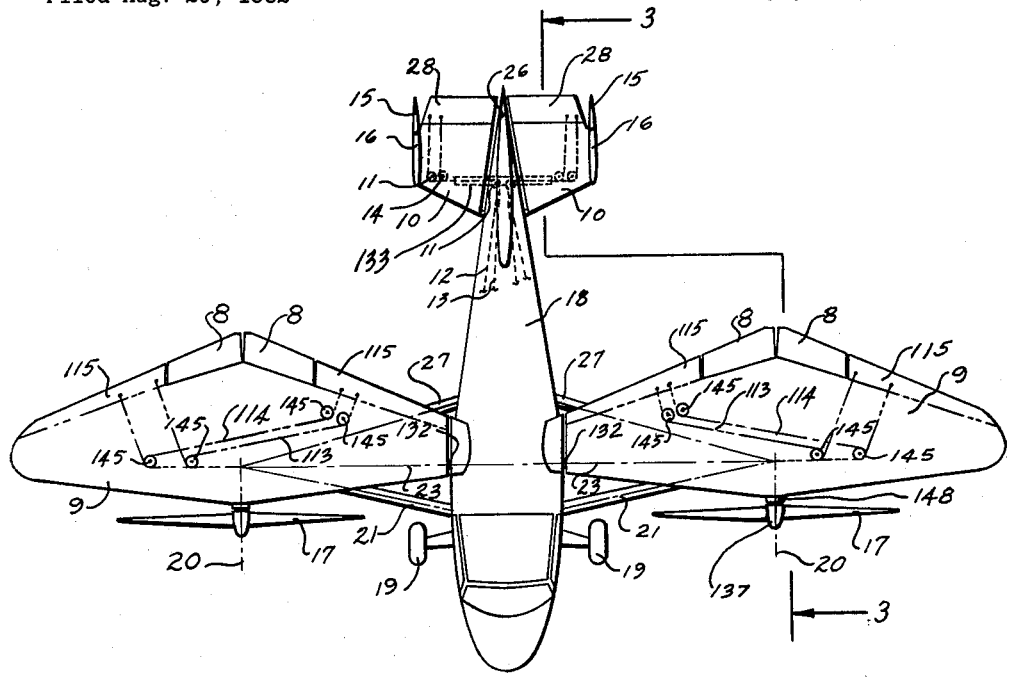

Referring to the drawings in greater detail, my invention deviates from the classic airplane, although the configuration is basically an evolution from my novel airplane of Patent Number 2,347,230 filed December 1938. The basic aerodynamic principles of the wings of the said patent are incorporated into this disclosure. Peculiar propeller locations and supports in combination with the wing give the airplane near vertical take-off and landing characteristics.

Although my invention is illustrated as an evolution of my prior patent it is expressly understood that many deviations may be made from the structure herein disclosed and from the aforesaid earlier patent without departing from the spirit of this invention.

In FIGURE 1 the wings 9 are swingably mounted on a horizontal hinge 23 as in the Patent Number 2,347,230 where the wings 4 are swingably mounted on the pivoting axis x—x in FIGURE 5. The control surfaces 8 in FIGURE 1 of this specification and drawings are swingably supported and pilot-controlled by similar structural and functional details as in the Patent Number 2,347,230 and the control surfaces 6 of the said patent in the FIGURES 7 and 8. And since most of this structure is already disclosed in the aforesaid patent, certain structural parts are not duplicated in this specification.

Figure 2:
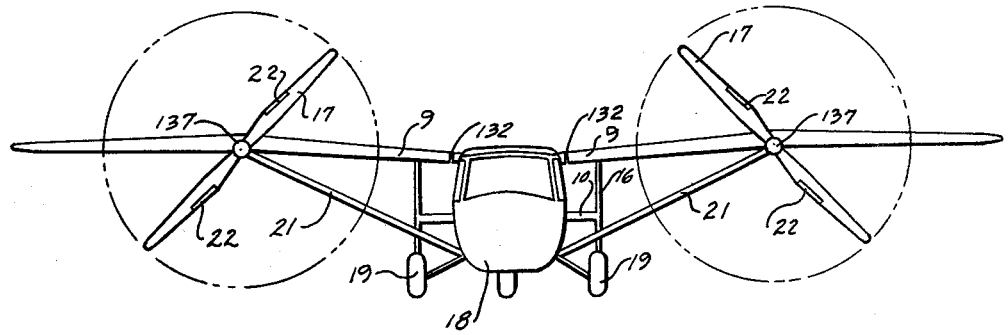
Figure 12:
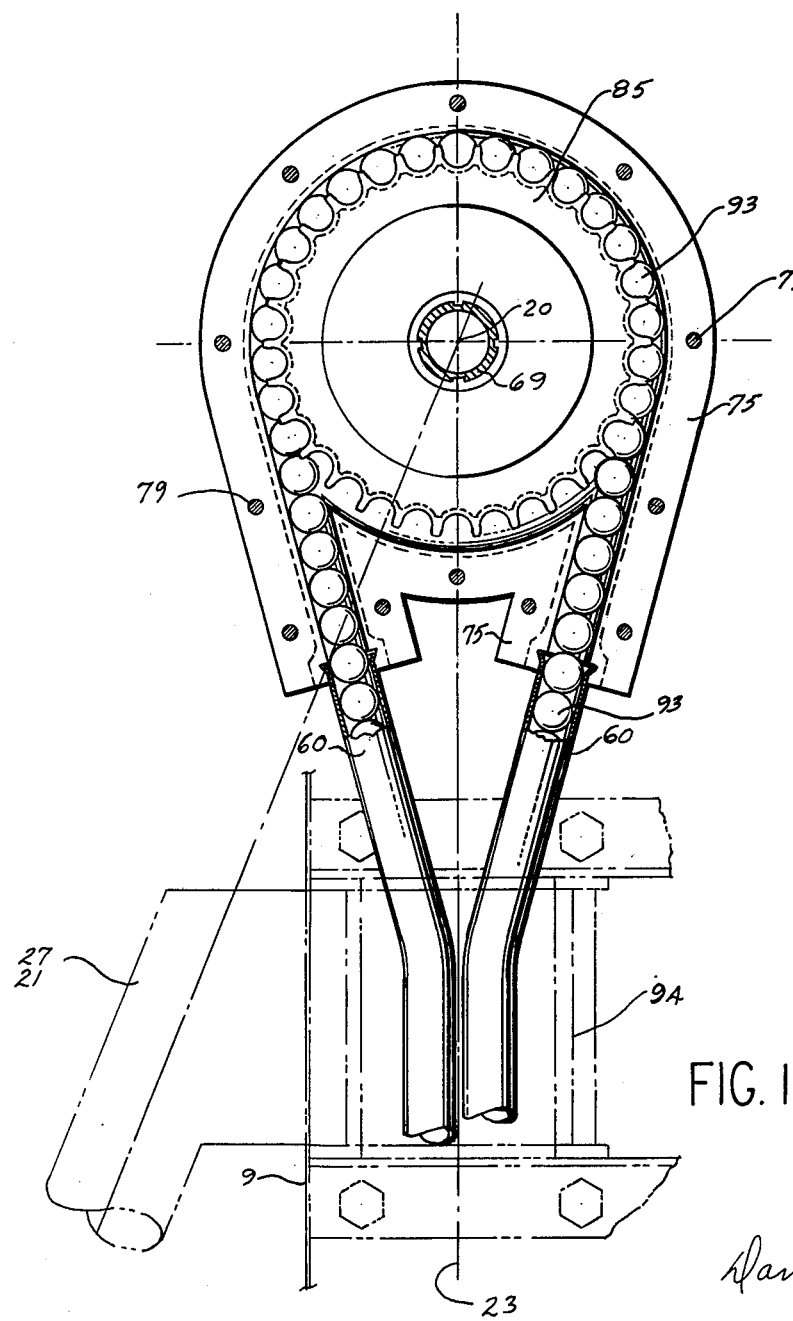
FIGURE 12 is an enlarged cross-sectional view taken on the line 12—12 in FIGURE 11.

The wings 9 in FIGURES 1 and 2 of this specification and drawings are supported at the mid-semi-span on a journal and bearing 94 as shown in the phantom structure in FIGURE 12, to which the struts 21 and 27 attach and support the said wings 9.

The juncture of the struts 21 and 27 form the housing 94 within the wing contour in FIGURE 9. The wing struts 21 and 27 enter the wing structure 9 through a clearance slot in the lower surface of the wing. The slot is elongated in length to permit the wing to rotate to positions shown alternately in FIGURES 3 and 4. The length of the clearance slot permits rotation of the wing to the attitude which produces a vectorial summation of equal propeller-thrust and wing-lift components as illustrated in FIGURE 16. A few degrees of over-travel beyond this attitude, for maneuverability and control, establishes the length of the slot, and the slot thereby limits the wing to acute angles of rotation.

The wings 9 of this disclosure are swingably supported independently of each other at the inboard ends at the fuselage 18 on journals 132, and similar to the wings 4 on 94 and 95 in the FIGURES 5 and 8 of the Patent Number 2,347,230. The wings 9 of this disclosure are maintained in a neutral position with respect to the fuselage 18, when the airplane is in a static position on the ground and when the wings are not being acted upon by air currents, by a bungee device attached to the wings 9 and the fuselage 18. This bungee device is not shown in these drawings, but it is similar to the elastic chord 106 and its related attachments 107 and 108 in FIGURES 5 and 8 of the Patent Number 2,347,230. The bungee may also serve as a limiting device to restrict upward rotation of the wing to acute angles of incidence.

At the mid-semi-span of the wings 9 and forward of the wing leading edges, of this specification and drawings, are mounted the propellers 17 as shown in FIGURES 1, 2, 3, 4, 5 and 8. These propellers 17 are driven remotely from the engine 34 which is shown in phantom lines within the fuselage 18 in FIGURE 4.

The fuselage 18 is more or less conventional, having two wheels 19 forward and one wheel aft. There could, however be one wheel forward and two aft, or two wheels forward and two aft, depending upon the designer's needs and desires for the utility of the aircraft.

To illustrate my invention I have disclosed a vertical tail assembly consisting of three fins, a central fin 26, and two side fins 16, and rudders 15 which are located outboard from the center line of the airplane. The fins are attached to the horizontal stabilizer 10. And the rudders are hinged to the fins 16. It is expressly understood that my invention may be applied to a single finned airplane as well. As shall be disclosed later, the outboard location of the fins can be used to place the rudders in the slip-stream of the propellers thereby providing effective rudder control for the airplane at zero ground velocity of the vehicle.

In the conventional location as shown in the FIGURES 1, 2, 3 and 4 is located a horizontal stabilizer 10. The stabilizer 10 is freely mounted on a horizontal hinge 133 which attaches the stabilizer 10 to the fuselage 18. To the stabilizer 10 are attached pilot-operated control surfaces 28. The control surface 28 hinges on the pivoting axis 134 in the FIGURES 3 and 4 through suitable hinging structure that supports the aerodynamic control surface 28 on the aft portion of the stabilizer 10.

The control surface 28 is directly pilot-operated through the cables 12 and 13 which are attached to the horns 136 on the control surface 28. The said cables 12 and 13 are guided through the pivoting axis of the hinge 133 of the stabilizer 10 and by means of suitable pulleys, 11 and 14 as shown in FIGURE 1. They are routed within the fuselage 18 forward to the pilot's cockpit.

Figure 4:
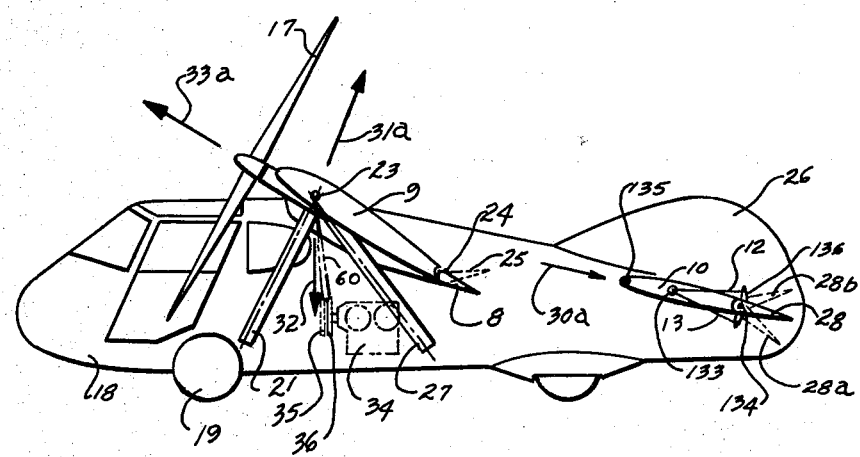

A counterbalance 135 of high density metal is secured to the leading edge of the stabilizer 10 in FIGURE 4 to statically balance the stabilizer assembly 10 about the horizontal pivoting axis 133.

The propeller shown in FIGURE 5 is mounted on a shaft 69. The fairing 137 encloses the propeller hub details, and the fairing 148 encloses the shaft 69 structural support to the wing 9.

In the FIGURE 8 the blades 17 are mounted to freely rotate within the hub 55 as shown in FIGURE 9 from the phantom line position to solid line position. Referring to the FIGURE 11 the blade 17 has a journaled end which projects into the hub 55 and is retained by means of the key ring in the groove 61 in the journal's inboard end. The spacer tube 138 surrounds the journal of the blade 17 and spaces the bearings 59 on the journal of the propeller blade 17. The nut 58 engages the threads on the journal of the blade 17 and secures the bearings 59 and spacer tube tightly against the groove key ring 61. The assembly is clamped against a shoulder 139 within the barrel of the hub 55 through the nut 57. The nut 57 engages the threads of the said hub 55 and bears against the outer bearing 59 and forces the blade assembly inward with the inner bearing 59 bearing against the shoulder 139.

Figure 11:
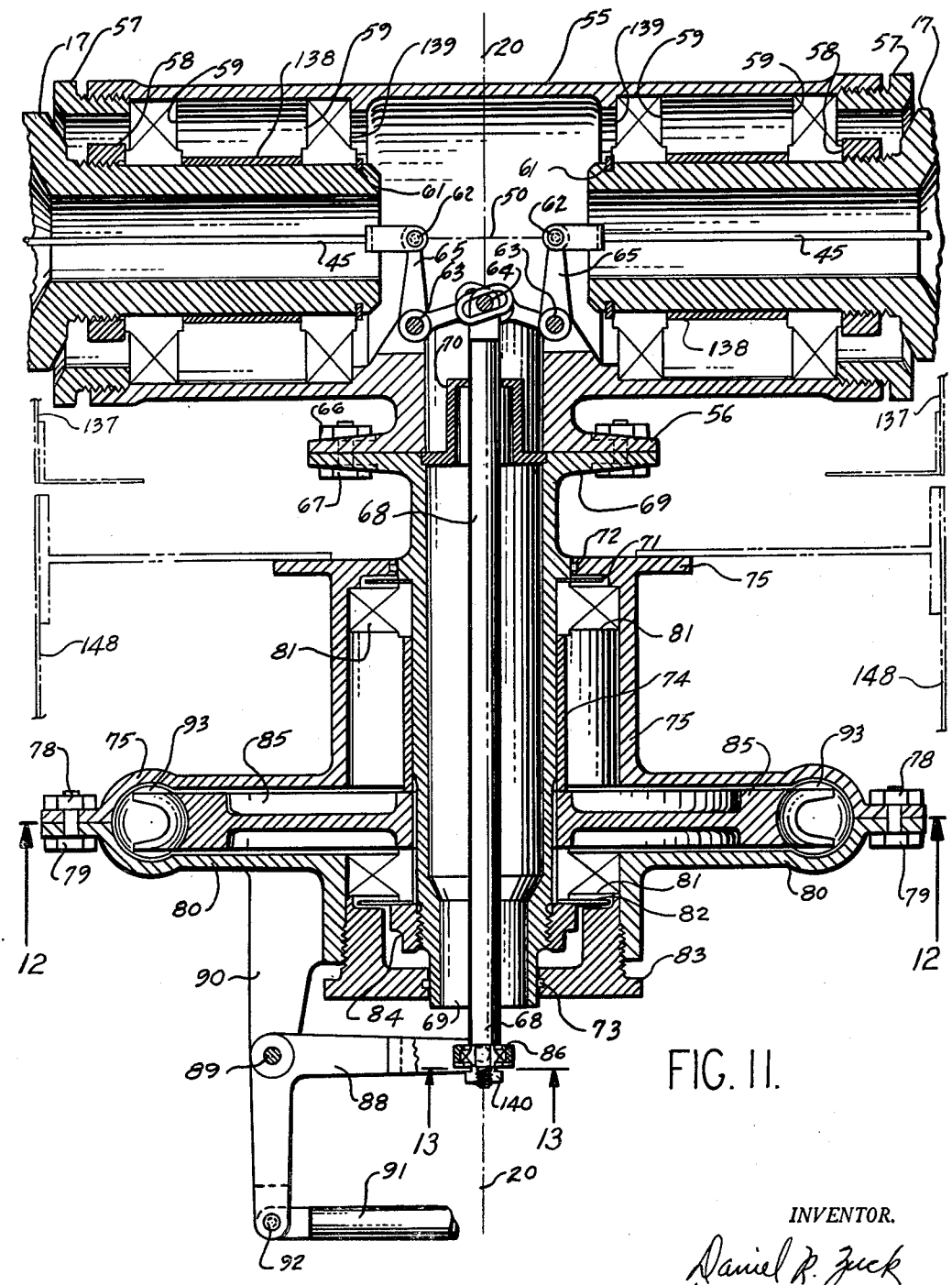
FIGURE 11 is an enlarged cross-sectional view taken on the line 11—11 in FIGURE 8.

The propeller hub assembly and propellers rotate about the propeller centerline 20 in the FIGURES 11, 5, and 1 through the shaft 69. In FIGURE 11 the shaft 69 is bolted to the hub assembly 55 through the flange 56. The shaft 69 passes through a housing 75 and is keyed to a propulsive drive sprocket 85 as shown also in FIGURE 12. And as observed, in FIGURE 11 the shaft 69 is hollow to permit the passage of the propeller pitch control element 68.

The shaft 69 is rotatably mounted within the housing 75, as shown in FIGURE 11, by means of the upper and lower bearings 81. To the shaft 69 is clamped the said bearings 81, the oil slinger rings 71 and 82, the drive sprocket 85, the tubular spacer 74, and the nut 84 which engages the threads in the shaft 69 and clamps the bearings and parts toward the upper shoulder of the said shaft 69.

The entire shaft 69 and its assembly is retained within the housing 75 and 80 by means of the nut 83 which engages threads in the housing 80 and forces the upper bearing 81 of the assembly to bear at the upper shoulder of the housing 75 and at the lower bearing 81 to bear on the said nut 83. The upper housing 75 and lower housing 80 are joined and clamped in alignment by means of the bolts 79 and nuts 78. The oil seals 72 and 73 are provided to retain the oil within the housing 75 and 80.

An integral projection 90 projecting from the lower housing 80 supports a control lever 88 which is pivotally supported on the pin 89. The control lever 88 through a pivotal connection 92 engages a control link 91 which ultimately leads to a pilot-operated control within the pilot's cockpit with the specific purpose of controlling the propeller blade's pitching angle directly by the pilot. The pilot's control is conventional and is not disclosed here for that reason.

Figure 13:
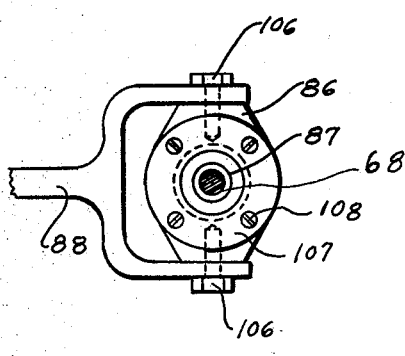
FIGURE 13 is an enlarged cross-sectional view taken on the line 13—13 in FIGURE 11.

The opposite end of the control lever 88 pivotally connects to a bearing retainer 86 through bolts 106 as disclosed in FIGURES 11 and 13. The bearing retainer 86 retains the bearing 87 by means of the clamping plate 107. The clamping plate 107 is attached to the bearing retainer 86 by means of the screws 108 which engage tapped threads in the bearing retainer 86.

The angular rotation of the control lever 88 transmits an up and down motion to the control rod 68. As shown in FIGURE 11, the control rod 68 is retained in the bearing 87 by the nut 140 which engages the threads on the lower end of the control rod 68. The upper end of the control rod 68 is centered on the rotating axis 20 by means of the sleeve 70. A pin 64 through the control rod 68 engages two bell cranks 65. The bell cranks 65 are pivotally connected through the pin 63 to the housing 55. The bell cranks 65 connect to the small control rods 45 through the pivotal connections 62. The vertical motions of the control rod 68 transmit horizontal motions to the small control rods 45 through the bell cranks 65.

The horizontal motions of the control rods 45 in FIGURE 11 are transmitted to the bell cranks 41 in the FIGURE 10 which are rotated about the pivotal connection 39. This motion in turn transmits to the control surface actuating link 38 and causes the control surface 22 to rotate about the pivotal connection 46 which unites the control surface 22 to the propeller blade body 17 as is shown by arrow 37 in FIGURE 9.

The counter weight 42 is swaged on the rod 45 in FIGURE 10, and also the collar 44 is swaged on to the rod 45 in the figure. Between 44 and 42 is retained one end of the bell crank 41 by means of the rod 45 passing through the said end of 41. Through the centrifugal action the counter weight 42 continually exerts a pressure tending to rotate the bell crank in the direction of the arrow 43 in FIGURE 10, thereby relieving the rods 45 of the compression loading in actuating the control surfaces 22.

The bell crank 41 is pivotally connected to the propeller blade body 17 through the pintal 39 and the support brackets 40 in FIGURE 9. The control link 38 and bell crank 41 are pivotally connected by means of the pin 54, and the control link 38 connects to the control surface 22 through the pivotal connection 47 as shown in FIGURES 9 and 10.

The propellers 17 are driven by means of a unique ball-drive illustrated in FIGURE 12. The balls 93 are guided into the sprocket housing portion of the housing 75 and 80 in FIGURES 11 and 12 through the tubes 60. As the balls 93 are pushed into the sprocket 85, they engage the teeth of the said sprocket 85 and transmit a rotational motion to the shaft 69 which rotates the propeller 17.

Although this unique drive has been used to simplify the transmittal of the engine power to the propeller and to eliminate the detrimental torque effects on the freely floating wings 9, it is expressly understood that other means of power transmittal to the propeller are anticipated in this disclosure, and that it shall not be construed to imply that this means of power transmittal is necessarily essential to the practical application of this invention. Hydraulic means, for example, could be used to transmit the engine power to the propellers.

The tubes 60 pass through the center of the wing 9 and its supporting bearing 94 as shown in FIGURE 12. These tubes 60 lead inboard and into the fuselage 18 to the engine 34 shown in phantom lines in FIGURE 4. The phantom objects 35 and 36 are housings which contain drive sprockets similar to the sprocket 85 in FIGURES 11 and 12. These said sprockets within the said housings 35 and 36 are keyed to the engine drive shaft and transmit the engine power to the balls 93 which through the above explained sequence of power transmittal rotate the propellers 17.

How my airplane with two propellers and a relatively small amount of power may take-off and land at exceptionally low landing speeds is apparent by reference to FIGURES 5, 6 and 7.

In FIGURE 5 the horizontal velocity of the air streamlines 96 are shown to the left and forward of the propeller. In the vectorial diagram of FIGURE 6 the horizontal air velocity is represented by the arrow 98 which is the horizontal velocity of the aircraft. Due to the action of the propeller 17, the air streamlines are deflected downward to 97 just forward of the propeller 17 in FIGURE 5. This direction 97 is also noted by the arrow 97 in the FIGURE 6. It is apparent from this vectorial diagram in FIGURE 6 that 97 is the resultant air velocity of the horizontal arrow 98, which is the horizontal aircraft air velocity 98 and the propeller thrust velocity arrow 99. The arrow 99 is the value of the artificially created propeller slipstream velocity on the propeller thrust axis 20.

As the air streamlines 97 leave the propeller, they flow somewhat in the manner indicated by 95 in FIGURE 5 due to the influence of the wing 9. The angle of attack of the wing 9 to the resultant air velocity is shown by the angle $\phi$ in FIGURE 5. Due to the positive angle of attack $\phi$ of the wing 9 to the airflow a lift vector 31a is produced which is centralized on the wing pivoting axis 23. The propeller thrust vector 33a is also centralized at this point 23.

In referring to FIGURE 7 it is seen how the dominant lift force 31a and the thrust force 33a cooperate to equal the weight 32 of the plane. The direction of the air velocity 97 is shown here for reference and it will be noted that lift 31a is normal to direction of this air velocity 97.

The propeller thrust force 33a can be divided into a horizontal thrust component 100 and a vertical thrust component 101. And the wing lift force 31a can be divided into a vertical lift component 102 and a horizontal lift component 103.

The summation of 102 and 101 produce the lift which equals the weight 32. The force 103 subtracts from the force 100 and leaves a limited amount of forward thrust to propel the airplane forward, thereby resulting in reduced horizontal flight speeds during take-off and landing.

The arrow 104 in FIGURE 7 merely represents the summation of 103 and the airplane drag at the above said reduced horizontal flight speed at take-off and landing, and the arrow 105 is equal and opposite to 104 and is the thrust component 100 shown acting through the wing pivoting axis 23, the point through which all the forces act and about which they are balanced.

The angular pitching forces of the wing 9 are also stabilized and controlled about the wing pivoting axis 23 through the action of the plot-controlled aerodynamic control surface 8, which pivots about its supporting axis 24 when acted upon by the pilot's control. The said pilot's control disclosed and illustrated in my Patent No. 2,347,230, filed December, 1938, wherein the aerodynamic control surface 6 of the said patent is similar in design and function to the aerodynamic control surface 8 of this specification.

The angle of attack $\phi$ and the horizontal angular relation of the propeller thrust axis is controlled and adjusted about the wing pivoting axis 23 through the action of the pilot-controlled surface 8. In FIGURE 5, as said surface 8 moves upward, the action of the airstream forces a clockwise rotation of the wing 9 and the propeller axis 20 about the wing pivoting axis 23, and as the said surface 8 moves downwardly the action of the airstream produces a counter-clockwise rotation of the wing 9 and the propeller thrust axis 20 which is fixed in its relation to the wing 9.

The propeller mounting herein disclosed is supported on the wing structure, and the wing being balanced about its pivoting axis 23 in a similar manner to the wings 4 about the axis X—X in my Patent Number 2,347,230, fild December 1938, permits a similar automatic response and control and freedom from stalling as I have disclosed in the said Patent Number 2,347,230.

The said wing 9 is statically balanced about the pivotal axis 23 by the propellers 17 and 120 being forward of the said axis, and the major volume of the surface of the wing 9 and the control surface 8 being aft of the said pivotal axis 23. The characteristic center of lifting pressure of the wing air foil 9 occurs at about the 25 percent chord point of the said wing airfoil; and in FIGURES 3, 4, 5, and 15 the said center of lifting pressure of the said airfoil is aft of the pivotal axis 23. This produces a counter-clockwise pitching moment about the pivotal axis 23 and the said pitching moment is balanced by a counter-acting force produced by the pilot-controlled surface 8 in FIGURE 5. The surface 8 controls the magnitude of the above said counter-acting force and thereby directs the attitude of the wing 9 and propeller axes with respect to the air streamlines 97 in FIGURE 5 and 112 in FIGURE 15. The above said balance of aerodynamic forces is vectorially illustrated in FIGURES 4 and 4A of Patent No. 2,347,230, filed December 1938.

The above manner of mounting the wings 9 is particularly advantageous for an airplane with vertical take-off capability wherein the airflow direction of take-off is downward in relation to the airplane's longitudinal axis, since the wings 9 always sense the wind direction and adjust to the proper angle of attack $\phi$ dependent upon the pilot-controlled surface 8. It is thus apparent that should the engine power fail, the wings 9 will automatically and without the pilot's attention rotate in a counter-clockwise direction and thereby permit the aircraft to assume a conventional glide to the ground.

In examination of FIGURE 7 it is apparent that to increase or decrease the lift component 101 of the thrust 33a the magnitude of the thrust vector 33a must be varied. This is accomplished by moving the control surface 22 in FIGURE 8 through the pilot's control from control 91 in FIGURE 11. In FIGURE 9 the rotation of the control surface 22 in the direction indicated by the arrow 37 produces an angular rotation of the propeller blade 17 in the direction of the arrow 48 about the blade pitching axis 50 and produces an increased propeller thrust force 33a in FIGURES 5 and 7.

The propeller blade 17 is statically and aerodynamically balanced about the pivoting axis 50, similar to the wing 9 about the pivoting axis 23. The force diagram is similar to FIGURE 4A in my Patent Number 2,347,230 where point 66 compares to the pivoting axis 50, and LR is similar to the propeller thrust 33a producing a counter-clockwise rotation which is reacted by LN which is produced by the control surface 22 of this patent specification.

The propeller 17 reacts in a similar relation to the relative airstream 51 as is seen in FIGURE 9 of this patent specification. The airstream direction 51 is the resultant of the airfoil's 17 rotational velocity 52 (r.p.m.) and the inflow velocity direction 53 which is parallel to the thrust line of the propeller's rotational axis 20. It is noted that the angle of attack $\phi$ is formed by the angular relationship of the airfoil 17 to the relative wind 51. This angle of the propeller 17 is directly controlled by the pilot through the actuation of the control surface 22 and varies the magnitude of the thrust.

It is seen that when the engine power fails and the r.p.m. arrow 52 is no longer present, 53 which is the forward velocity of the plane, rotates the airfoil clockwise to the 17a position. Thus automatic feathering of the propeller in an emergency to the minimum drag position of the propeller is accomplished without the pilot's attention. The propeller automatically senses the changed direction of the airflow conditions and adjusts automatically to the proper attitude.

It is obviously necessary in my propeller drive scheme to transfer the propeller rotation power through and parallel to the wing pivoting axis 23. Transferring of the power by means of a torque shaft would disturb the aerodynamic balance of the wing about the chordwise pitching axis 23. I have accomplished the elimination of the torque about the axis 23 through the use of the ball-spocket drive 93–85 in FIGURES 11 and 12.

Figure 3:
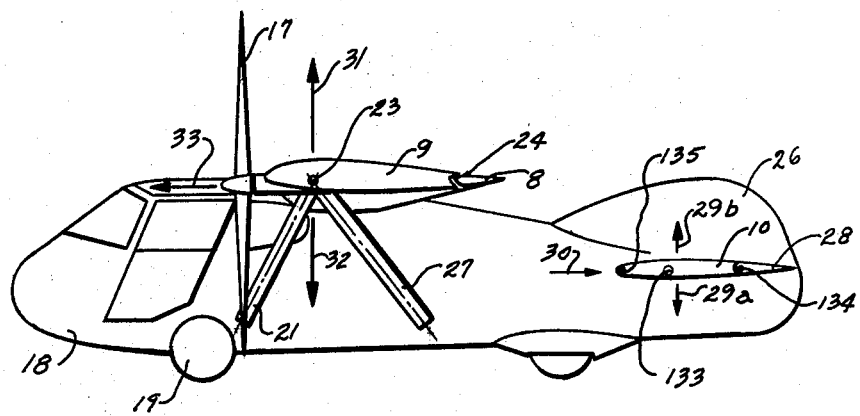

I have chosen to mount the horizontal tail 10, FIGURES 1, 3, 4, in a freely floating manner on a horizontal pivoting axis 133 similar to the wings 9 on the pivoting axis 23 and with a bungee device (not shown) to return the stabilizer to its neutral position with respect to the fuselage. Then angular rotation of the stabilizer 10 with respect to the relative wind 30 is controlled through the action of the control surface 28 in FIGURE 4. When the control surface is in the position 28b, the stabilizer 10 rotates clockwise with respect to 30a and produces an upward tail lift on the fuselage. When the control surface is in position 28a, the stabilizer 10 rotates counter-clockwise and produces a downward tail lift on the fuselage.

Since the direction of the wind 30, of FIGURE 3 may vary as shown by 30a in FIGURE 4 due to the variation of the direction of the air streamlines 95 in FIGURE 5 from the wings 9 and due to the speed of the plane, and yet require a relatively constant tail lift, the advantage of the freely floating stabilizer in supplying this constant lift is apparent in comparing FIGURES 3 and 4. The floating tail senses the direction of airflow from the wing and propellers and adjusts its attitude accordingly to produce the desired tail lift.

So far I have disclosed only the features necessary for relatively slow flight for take-off and landing; although with sufficient power to generate the required propeller thrust, and with sufficient propeller thrust and wing lift, the foregoing disclosed configuration is capable of vertical take-off and landing.

Figure 14:
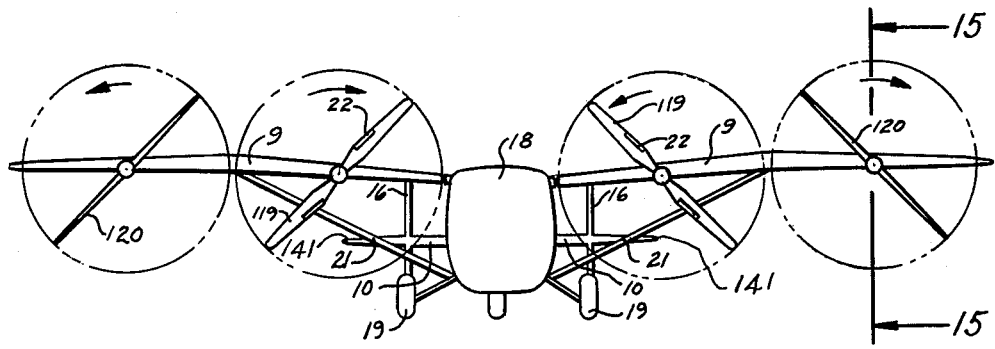
FIGURE 14 is a front view of another configuration of my invention having four propellers and which is similar to FIGURE 2 except as shown.

Vertical take-off and landing and hovering is accomplished more easily by my invention through the following additions to the above described configuration. In FIGURE 14 the airplane configuration is identical to FIGURES 1, 2, and 3 except for the addition of two more propellers and the relocation of the propellers in a spanwise location to fully envelop the wing within the propeller slipstream. The stabilizer 10 also has an extension 141 to enable the tail to be more effectively located within the propeller slipstreams. The outboard fins and rudders 16 and 15 are located within the propeller slipstream also, enabling the airplane when hovering to be fully controlled through the propeller slipstream effect on all the tail control surfaces.

In the FIGURE 14 are shown two inboard propellers 119 and two outboard propellers 120. The outboard propellers 120 are shown feathered as shown also in the phantom lines 17a in FIGURE 9.

Figure 17:
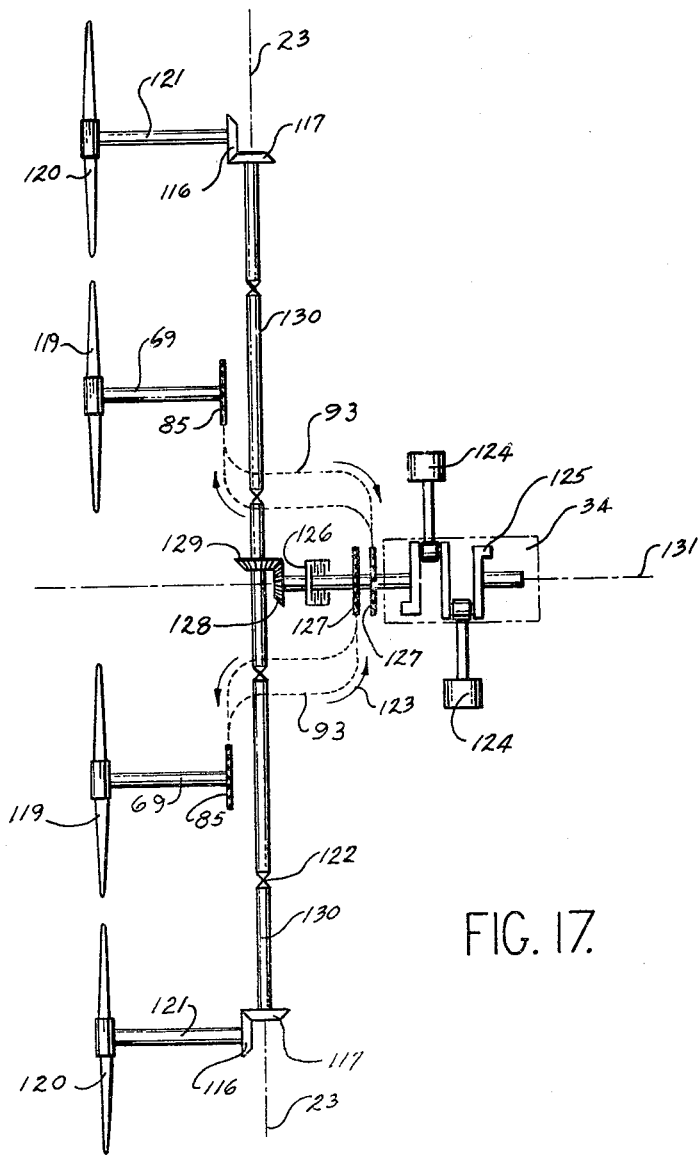
FIGURE 17 is a schematic view of the propulsive power drive arrangement to the propellers on the configuration of the aircraft shown in the FIGURE 14.

How four propeller are driven simultaneously and later two propellers driven exclusively with the outboard propellers feathered is shown in FIGURE 17. The inboard propellers 119 are driven similarly to the propellers in FIGURES 1, 2, and 3. The propellers 119 are driven by shafts 69, the balls 93, and sprockets 85 at the propeller shafts and 127 at the engine shaft as further illustrated in FIGURES 11 and 12.

The outboard propellers are driven through the auxiliary shafts 130, 121 and bevel gears 128, 129, 117, 116 and the universal joints 122. The bevel gear 128 from clutch 126 delivers the engine shaft power to the cross-shaft 130. When the outboard propellers are not required for efficient cruising of the airplane, the power from the engine to the shaft 130 is disconnected by means of the clutch 126. And the outboard propellers 120 sensing the new airflow conditions automatically assume a feathered attitude.

In FIGURE 17, items 124 are the engine pistons, 125 is the engine crank-shaft, and 34 is the phantom outline of the engine case, and 131 is the centerline of the engine crankshaft, and 23 is the centerline of the pivoting axis of the wings 9.

Figure 15:
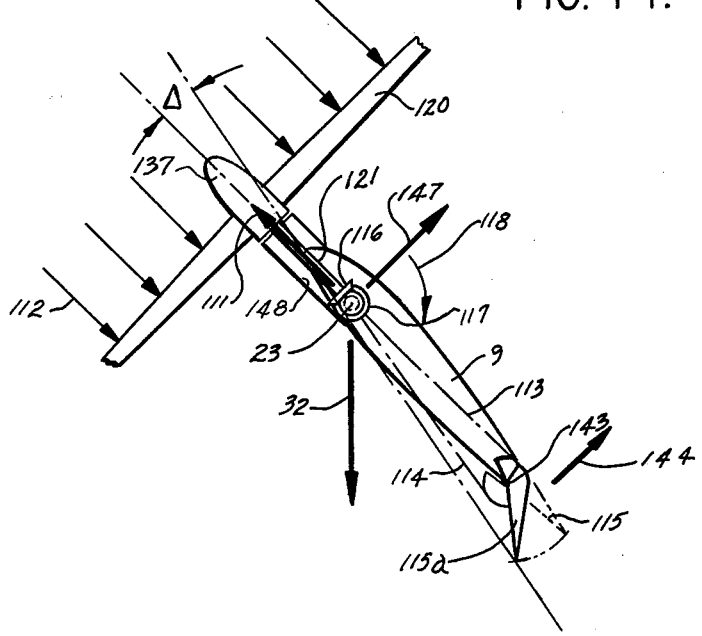
FIGURE 15 is an enlarged cross-sectional view taken on line 15—15 shown in FIGURE 14 with the propeller thrust angle shown rotated to about 45 degrees.

In FIGURE 15 is shown the attitude of the wings 9 during vertical take-off and landing. The power to the outboard propellers is transferred along the wing pivoting axis and creates a torque about the wing pivoting axis 23 in the direction of the arrow 118 which is clockwise. The torsion force 118 is reacted and balanced by the wing flap 115, FIGURES 1 and 15. The wing flap 115 is thus moved from the phantom position 115 to 115a and thus creates an angle of attack to the air streamlines 112. This creates an increased wing lift as shown by the arrow 147 in FIGURE 15. The propeller thrust 111 acts along the propeller shafts 121 and 69 in FIGURES 15 and 17.

The wing lift vector 147 and the propeller thrust vector 111 combine to lift the weight vector 32 as shown in FIGURES 15 and 16. The wing lift vector 147 can be divided into two forces, 149 which is vertical and 110 which is horizontal. The propeller thrust vector can also be divided into two forces, 150 which is vertical and 109 which is horizontal. The summation of the lift components 149 and 150 is equal and opposite to the weight 32 of the plane; and the horizontal summation, 109 and 110 being equal and opposite, is zero. The airplane is thus suspended motionless in a hovering attitude.

It is apparent that the ability of the plane to hover regardless of the propeller thrust angle and wing lift angle is dependent directly upon the summation of the horizontal forces of the airplane being equal to zero when the airplane hovers.

In FIGURE 15 the wing-flap 115 is rotated about its hinge center by means of cables 113 and 114 which by means of pulleys 145 shown in FIGURE 1 are led through the wing pivoting axis 23 to the fuselage and the pilot's control.

Many variations may be effected without departing from the spirit of my invention. For example, instead of utilizing the torque 118 of the outboard propellers to offset the aft lifting reaction 144 of the flaps 115, a mechanical actuator connected to the wings and fuselage may be employed. It is apparent that the angle of attack to the propeller slipstream must be increased for vertical take-off and landing and for hovering, and the employment of a trailing edge flap accomplishes this most effectively. Although supplying an actuator to the wings 9 and fuselage 18 somewhat departs from the freely floating principle I have used on the wings 9, this arrangement nevertheless fully utilizes the principle of vectorial summation of propeller thrust and wing lift forces I have evolved for hovering, vertical take-off and landing.

I have shown the wing flaps 115 in phantom in FIGURE 1. However they are used only in the configuration with the four propellers as is shown in FIGURE 14.

Therefore, although I have herein shown and described my invention in what I have conceived to be the most practical and preferred embodiment, it is recognized that departures may be made therefrom within the scope of my invention, which is not limited to the details disclosed herein, but is accorded the full scope of the claims so as to embrace any and all equivalent structures.

Having described my invention, what I claim as new and desire to secure by Letters Patent is:

1. A monoplane for take-off and landing at very steep angles which includes: a fuselage, right and left wings extending symmetrically from the right and left sides of said fuselage, and adapted to rotate freely and independently of each other about the same wing rotation axis transverse to said fuselage, said wing rotation axis being located forward of the center of lift of said wings; at least one propeller mounted at the forward edge of each of said right and left wings, symmetrically with respect to said fuselage, and adapted to direct a slipstream rearward over said wing surfaces; a pilot-controlled control surface at the trailing edge of said wings, rotatable about an axis transverse to said fuselage, and disposed in the slipstream of the propeller on said wing; said fuselage having a tail assembly spaced to the rear of said wings; said tail assembly having stabilizer means extending to the right and left of said fuselage and freely rotatable about a common axis transverse to said fuselage; pilot-controlled surfaces at the trailing edge of each of said right and left stabilizers, and said stabilizer control surfaces having an axis of rotation at the trailing edge of said stabilizers; wing support means extending from each side of said fuselage to said wing, and supporting said wing at said axis of rotation at a point substantially outboard of said fuselage, said wing support means limiting the rotation of said wings about said wing rotation axis to an angle at which the vertical component of the wing's lift is at least as great as the vertical component of the propeller's thrust.

2. A monoplane for take-off and landing at very steep angles which includes: a fuselage, right and left wings extending symmetrically from the right and left sides of said fuselage, and adapted to rotate freely and independently of each other about the same wing rotation axis transverse to said fuselage, said wing rotation axis being located forward of the center of lift of said wings, and lying in a vertical plane passing through the center of gravity of said monoplane; at least one propeller mounted at the forward edge of each of said right and left wings, symmetrically with respect to said fuselage, and adapted to direct a slipstream rearward over said wing surfaces; a pilot-controlled control surface at the trailing edge of each of said wings, rotatable about an axis transverse to said fuselage, and disposed in the slipstream of the propeller on said wing; said fuselage having a tail assembly spaced to the rear of said wings; said tail assembly having stabilizer means extending to the right and left of said fuselage and freely rotatable about a common axis transverse to said fuselage; pilot-controlled surfaces at the trailing edge of said right and left stabilizers, said stabilizer control surfaces having an axis of rotation at the trailing edge of said stabilizers; pilot-controlled rudders on each side of said tail, said rudders being rotatable about a vertical axis, and being disposed in the slipstream of said right and left propellers respectively; and right and left wing stop means for limiting the rotation of said right and left wings, respectively, about said transverse wing rotation axis to an angle at which the vertical component of the said wing's lift is at least as great as the vertical component of the propeller's thrust.

3. A monoplane comprising a fuselage, a tail on the fuselage, a wing, and propellers on separate axes generally parallel to the chord of the wing and the propellers located along the span of the wing and forward of the wing leading edge, the wing intersecting a vertical plane passing through the C.G. of the aircraft and having rotatable attachment means on a spanwise axis for transverse attachment to the fuselage and having means limiting the rotation of the wing to acute angles of elevation with respect to the fuselage during the flight regime of the aircraft, the fuselage having cooperative means for rotatable attachment of the wing, the wing having controllable actuating means for the angular elevation of the wing with respect to the fuselage, the said means limiting the angular elevation of said wing to acute angles with respect to the fuselage to limit the wing and propellers to cooperative angles of elevation for complementary vertical wing-lift and vertical propeller thrust components for vertical take-off and landing and reduced take-off and landing speeds and distances, each propeller comprising a hub and airfoil blades and complementary shafting connecting to propulsive means to drive said propeller, rotatable attachment means on the blades and cooperative means in the hub to vary the propeller blade incidence and for feathering said propeller blades, control means to the propeller blades to vary the blade incidence and to feather the blade, each propeller having support means for propulsive rotation of the propeller forward of the wng and the wing having cooperative attachment means for support of the propeller, the said propellers comprising outboard propellers and inboard propellers on separate axes located along the span of the wing and forward of the wing leading edge, driving means connecting the outboard propellers and inboard propellers to said propulsive means, the outboard propellers having a clutch means to disconnect the propulsive means thereby to direct the total propulsive energy to the inboard propellers with the outboard propellers feathered in the minimum drag attitude and providing the aircraft with efficient slow-speed and high-speed flight capability.

4. A monoplane with variable direction slipstream utilizing the vectorial summation of the vertical propeller-thrust component and vertical wing-lift component in opposition to the gravity vector for take-off and landing comprising a fuselage, a tail on the fuselage, a wing and propellers on separate axes generally parallel to the chord of the wing and the propellers located along the span of the wing and forward of the wing leading edge, the wing intersecting a vertical line passing through the C.G. of the aircraft and having rotatable means on a spanwise axis for transverse attachment to the fuselage and having means limiting the rotation of the wing to acute angles of elevation with respect to the fuselage during the flight regime of the aircraft, the wing having controllable actuating means for angular elevation of the wing with respect to the fuselage, each propeller comprising a hub and airfoil blades and complementary shafting connecting to propulsive means to drive said propellers, the propellers having supporting means for rotation of the propellers forward of the wing and the wing having cooperative attachment means for support of the propellers, the said propellers comprising outboard propellers and inboard propellers on separate axes located along the span of wing and forward of the wing leading edge, each propeller having rotatable attachment means on the blades at the hub and cooperative means in the hub to vary the propeller-blade incidence and for feathering the said blades, the propellers having driving means connecting the outboard propellers and inboard propellers to said propulsive means, the outboard propellers having a clutch means to disconnect the said propulsive means and thereby to direct the total propulsive energy to the inboard propellers with the outboard propellers feathered in the minimum drag attitude and providing the aircraft with efficient low-speed and high-speed flight capability, for control of the fuselage-tail balancing a freely floating horizontal stabilizer comprising the horizontal tail and having a rotatable attachment means horizontal to the fuselage for free rotation, cooperative rotatable means on the fuselage tail for attachment of the horizontal stabilizer, said rotatable attachment means of the horizontal stabilizer being located forward of the center of aerodynamic-lifting pressure of the stabilizer, the horizontal stabilizer having a counter-weight means forward of the rotatable attachment means on the fuselage for statically balancing the stabilizer about the said rotatable attachment at the fuselage, an aero-dynamic surface hinged to the trailing edge of the horizontal stabilizer with control means to the pilot for variation of the fuselage-tail balancing force.

5. A monoplane with variable direction slipstream utilizing the vectorial summation of the propeller-thrust components and vertical wing-lift components in opposition to the gravity vector for take-off and landing comprising a fuselage, a tail on the fuselage, a wing, trailing edge flaps on the wing, and propellers on separate axes located along the span of the wing and forward of the wing leading edge, the wing intersecting a vertical plane passing through the C.G. of the aircraft and having rotatable attachment means on a spanwise axis for transverse attachment to the fuselage and having means limiting the rotation of the wing to acute angles of elevation with respect to the fuselage during the flight regime of the aircraft, the wing having support means at the trailing edge for flaps and the flaps having cooperative means for support and actuation of the flaps, the wing having controllable actuating means for angular elevation of the wing with respect to the fuselage, each propeller comprising a hub and airfoil blades and complementary shafting connecting to propulsive means to drive said propellers, the propellers having support means for propulsive rotation of the propellers forward of the wing and the wing having cooperative attachment means for support of the propellers, the propeller blades having rotatable attachment means at the hub and cooperative means in the hub to vary the propeller blade incidence and control means to the propeller blades to vary the blades incidence by the pilot, the said propellers comprising outboard propellers and inboard propellers on separate axes located along the span of the wing and forward of the wing leading edge, feathering means in the propellers and pilot-control means thereto, driving means connecting the outboard propellers and inboard propellers to said propulsive means, the outboard propellers having a clutch means to disconnect the propulsive means and thereby to direct the total propulsive energy to the inboard propellers with the outboard propellers feathered in the minimum drag attitude and providing the aircraft with efficient low-speed and high-speed flight capability.

6. A monoplane having a re-directed slipstream and utilizing the vertical summation of the vertical propeller-thrust components and the vertical wing-lift component in opposition to the gravity vector for substantially vertical take-off and landing comprising a fuselage, a tail on the fuselage, a wing, flaps on the trailing edge of the wing and propellers on separate axes generally parallel to the chord of the wing and the propellers located along the span of the wing and forward of the wing leading edge, the wing having attachment means to the fuselage and intersecting a vertical plane passing through the C.G. of the aircraft, the wing having support means at the trailing edge for said flaps and the flaps having cooperative means for the support and actuation of the flaps on the wing and actuating means to the flaps for control by the pilot, each propeller comprising a hub and airfoil blades and complementary shafting connecting to propulsive means to drive said propellers, the propellers having support means for propulsive rotation forward of the wing and the wing having cooperative attachment means for support of the propellers, the propellers having rotatable means at the hub for said blades and cooperative means in the hub to vary the propeller-blade incidence, actuating means within the hub and control means to the pilot to vary the propeller-blade incidence, the said propellers comprising outboard propellers and inboard propellers on separate axes located along the span of the wing and forward of the wing leading edge, control means and actuating means to feather the propeller blades, driving means connecting the outboard propellers and inboard propellers to said propulsive means, the outboard propellers having a clutch means to disconnect the propulsive means and thereby to direct the total propulsive energy to the inboard propellers with the outboard propellers feathered in the minimum drag attitude and providing the aircraft with efficient low-speed and high-speed flight capability.

7. A monoplane for takeoff and landing at very steep angles with automatic wing means angularly responsive upwardly and downwardly to the relative wind direction in flight which includes: a fuselage, pitching control means on the fuselage for in-flight control of the fuselage independently of the wings comprising an adjustable horizontal tail on the fuselage, right and left wings extending symmetrically from the right and left sides of the fuselage having means adapting the wings to rotate freely and independently of each other on horizontal axes of the wings transverse to the fuselage, the wings having bearing means to permit the wings to adjust to a positive and negative angle of incidence respectively relative to the fuselage in response to the variable direction of the relative wind, the rotation axes of the wings being located forward of the center of lift of the wings and substantially at the vertical plane through the C.G. of the monoplane, at least one propeller supported forward of the leading edge of each said right and left wings symmetrically located spanwise with respect to the fuselage and adapted to direct a slipstream over the wings, propulsive means in the fuselage including complementary shafting and means connecting to the propellers on the wings to drive the propellers, aerodynamic means associated with the wings to vary the wings' incidence excluding mechanical actuators comprising pilot-controlled airfoil surfaces hingedly secured to the trailing edges of the wings and disposed in the slipstream of the propellers, means associated with the bearing means associated with the wings to limit the upward angle of incidence of the wings and propellers to an angle of the vertical propeller-thrust's vector that does not exceed the vertical wing-lift's vector, structure means comprising the wings, propellers, pilot controlled surfaces, and associated shafting to the propellers distributed about the horizontal rotation axes of the wings so that the combined center of gravity of the wing assembly is slightly forward of the said horizontal rotation axis of the wings.

8. A monoplane having two or more propellers enveloping the wing substantially in the propellers' slipstream and having control means to redirect the propellers' slipstream to a downward angle to utilize simultaneously the summation of the upward vertical propeller thrust vector and the equal and greater respectively, but not less, upward wing lift vector for landing and taking-off which includes: a fuselage, a horizontal tail on the fuselage for control of the pitching angle of the fuselage, right and left wings supported on the fuselage on bearing means substantially at a vertical plane through the center of gravity of the monoplane and the said bearing means being on a transverse rotation axis to the fuselage with means to vary the incidence of the wings in flight, propellers supported forward of the wings by bearing means on the said wings and the wings enveloped substantially in the propellers' slipstream, propulsive means in the fuselage and complementary shafting to the propellers to drive the propellers, aerodynamic surfaces on the wings within substantially the airfoil outline of the wings movably secured on hinge means spanwise on the trailing edge of the wings and located in the propellers' slipstream to vary the lifting and rolling forces respectively of the plane by the aerodynamic action of the propellers' slipstream on the wings during takeoff and landing resulting in substantially reduced forward speed of the plane, means associated with the bearing means in the wings to enable the wings to assume a negative angle of incidence with respect to the fuselage in response to the variation in direction of the relative wind, means supporting the wings to limit the upward angle of rotation of the wings and the propellers to a propeller thrust angle of the vertical propeller thrust vector that does not exceed the vertical wing lift vector of each said wing.

9. In an airplane, a fuselage, a pilot-controlled horizontal tail attached to the fuselage to control the pitching attitude of the said fuselage, secured to the fuselage substantially at the center of gravity on a vertical plane through the monoplane a freely floating wing angularly responsive upwardly and downwardly to the relative wind direction independently of the fuselage and supported on spanwise bearing means on a horizontal axis of the wing located a relatively small distance forward of the center of aerodynamic lift of the wing and transverse to the fuselage, means to vary the incidence of the wing positively and negatively relative to the fuselage excluding mechanical actuators associated with the said wing bearing means comprising pilot controlled aerodynamic surfaces hingedly secured to the trailing edge of the wing within substantially the outline of the wing's airfoil to exert a positive and negative pitching aerodynamic force respectively responsive to the pilot's control to vary the incidence of the wing thereby to vary the lift of the wing and propellers, supported by bearing means on the wing on each side of the fuselage at least one large propeller forward of the wing's leading edge having rotation axes parallel to the fuselage and spaced outboard of the fuselage along the span of the wing with the large diameters of the propellers substantially enveloping the wing and control surfaces in the propellers' slipstream, each propeller comprising a hub and airfoil blades and complementary shafting connecting to and including propulsive means in the fuselage to drive the said propellers.

10. In an airplane, a fuselage, a pilot-controlled horizontal tail attached to the fuselage to control the pitching attitude of the said fuselage, secured to the fuselage substantially at the center of gravity on a vertical plane through the monoplane a freely floating wing angularly responsive upwardly and downwardly to the relative wind direction independently of the fuselage and supported on spanwise bearing means on a horizontal axis of the wing located a relatively small distance forward of the center of aerodynamic lift of the wing and transverse to the fuselage, means to vary the incidence of the wing positively and negatively relative to the fuselage excluding mechanical actuators associated with the said wing bearing means comprising pilot-controlled aerodynamic surfaces hingedly secured to the trailing edge of the wing within substantially the outline of the wing's airfoil to exert a positive and negative pitching aerodynamic force respectively responsive to the pilot's control to vary the incidence of the wing thereby to vary the lift of the wing and propellers, supported by bearing means on the wing on each side of the fuselage at least one large diameter propeller forward of the wing's leading edge having rotation axes parallel to the fuselage and spaced outboard of the fuselage along the span of the wing with the large diameters of the propellers substantially enveloping the wing and control surfaces in the propellers' slipstream, each propeller comprising a hub and airfoil blades and complementary shafting connecting to and including propulsive means to drive said propellers, rotatable attachment means on the blades and cooperative means in the hub to vary the propeller blades' incidence and to feather the blades, pilot-controlled means connected to the blades to vary the incidence of the propellers, means associated with the wing bearing means to limit the upward angle of rotation of the wing and propellers to an angle where the propeller-thrust vertical vector does not exceed the wing-lift vertical vector, structure means comprising the wing, propellers, pilot-controlled control surfaces, and associated shafting to the propellers and including the propulsive means distributed about the horizontal rotation axis of the wing so that center of gravity of the combined wing assembly is slightly forward of the said horizontal rotation axis of the wing.

References Cited in the file of this patent

UNITED STATES PATENTS

| | | |
|---|---|---|
| 1,786,545 | Noeggerath | Dec. 30, 1930 |
| 1,846,992 | Decker | Feb. 23, 1932 |
| 1,951,817 | Blount | Mar. 20, 1934 |
| 2,630,986 | Gumbs | Mar. 10, 1953 |

FOREIGN PATENTS

| | | |
|---|---|---|
| 437,447 | Great Britain | Oct. 28, 1935 |